(12) United States Patent
Sommer et al.

(10) Patent No.: US 11,765,214 B2
(45) Date of Patent: Sep. 19, 2023

(54) GROUP COMMUNICATIONS PLATFORM

(71) Applicant: Apple Inc., Cupertino, CA (US)

(72) Inventors: Bruno M. Sommer, Sunnyvale, CA (US); Leanid Vouk, Cupertino, CA (US); Blerim Cici, San Jose, CA (US); Berkat S. Tung, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/224,072

(22) Filed: Apr. 6, 2021

(65) Prior Publication Data

US 2021/0329044 A1 Oct. 21, 2021

Related U.S. Application Data

(60) Provisional application No. 63/011,966, filed on Apr. 17, 2020.

(51) Int. Cl.
*H04L 65/403* (2022.01)

(52) U.S. Cl.
CPC .................. *H04L 65/403* (2013.01)

(58) Field of Classification Search
CPC ... H04L 65/403; H04L 51/10; H04L 65/1069; H04L 12/1822; H04L 65/4015; H04L 67/131; H04M 7/0027; G06F 9/52
See application file for complete search history.

(56) References Cited

U.S. PATENT DOCUMENTS

| | | | | |
|---|---|---|---|---|
| 10,142,391 | B1* | 11/2018 | Brisebois | H04L 41/5009 |
| 2005/0071440 | A1* | 3/2005 | Jones | H04L 67/14 |
| | | | | 709/218 |

(Continued)

OTHER PUBLICATIONS

Febretti, et al., "Multiview Immersion in Hybrid Reality Environments," University of Illinois, Thesis, Jan. 2017, retrieved from https://indigo.uic.edu/articles/thesis/multiview_immersion_in_hybrid_reality_environments/10860518/files/19364861.pdf.

(Continued)

*Primary Examiner* — Nicholas R Taylor
*Assistant Examiner* — Tania M Pena-Santana
(74) *Attorney, Agent, or Firm* — BAKERHOSTETLER

(57) ABSTRACT

A group communications platform facilitates that sharing of an application environment with other users. The platform may receive a request to initiate a group session for a local user and a remote user. An out-of-process network connection with a system communication channel between a local computing device associated with the local user and a remote computing device associated with the remote user may be established for the group session. A system call may be received from a local instance of a first application on the local computing device to transfer local data to a remote instance of the first application on the remote computing device via the out-of-process network connection. The local data may be transferred to the remote instance of the first application on the remote computing device via the out-of-process network connection and the system communication channel. The local data may include state data of the local instance of the first application for updating a state of the remote instance of the first application.

20 Claims, 4 Drawing Sheets

(56) References Cited

U.S. PATENT DOCUMENTS

| | | | | |
|---|---|---|---|---|
| 2011/0258303 | A1* | 10/2011 | Nath | G06F 9/468 |
| | | | | 709/223 |
| 2014/0022146 | A1* | 1/2014 | Thangadorai | H04N 21/43615 |
| | | | | 345/2.3 |
| 2015/0163733 | A1* | 6/2015 | Wang | H04W 48/20 |
| | | | | 370/338 |
| 2015/0163788 | A1* | 6/2015 | Karunakaran | H04W 72/51 |
| | | | | 370/254 |
| 2015/0172757 | A1* | 6/2015 | Kafle | H04W 8/005 |
| | | | | 725/81 |
| 2021/0399911 | A1* | 12/2021 | Jorasch | H04L 12/1822 |

OTHER PUBLICATIONS

International Search Report and Written Opinion from PCT/US2021/026393, dated Jul. 6, 2021, 16 pages.

* cited by examiner

GROUP COMMUNICATIONS PLATFORM

CROSS REFERENCE TO RELATED APPLICATIONS

This application claims the benefit of priority to U.S. Provisional Patent Application No. 63/011,966, filed on Apr. 17, 2020, the disclosure of which is hereby incorporated herein in its entirety.

TECHNICAL FIELD

The present description relates generally to multi-user environments in computing platforms.

BACKGROUND

Extended reality applications create simulated environments with which a user may interact using an electronic interface. These interactions become richer and more interesting experiences when they are shared with other users.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
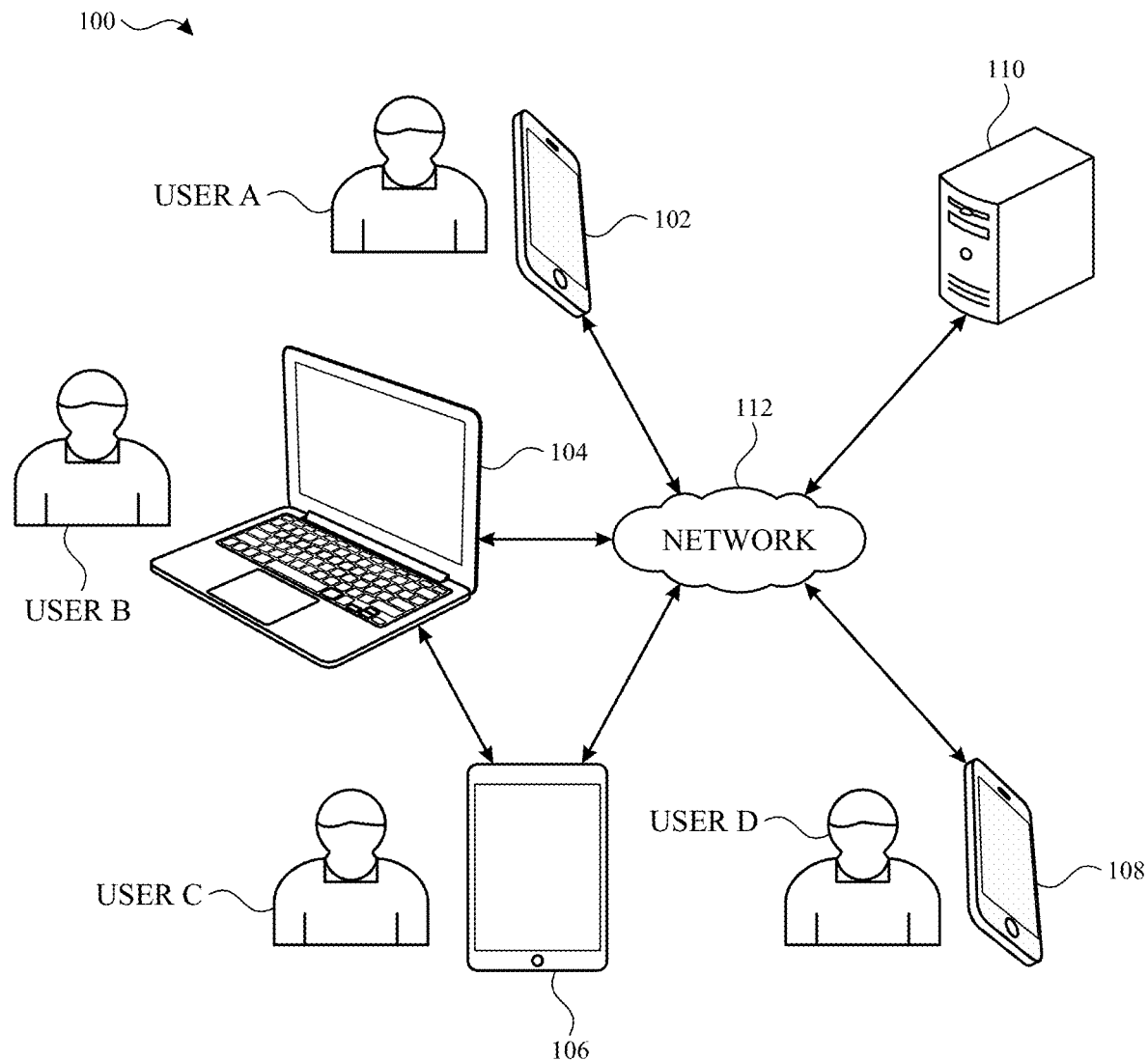
FIG. 1 illustrates an example network environment in which a group communications platform may operate in accordance with aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Expanding simulated environments such as XR environments to allow multiple users to interact with one another and share the experience of the simulated environments creates richer and more interesting experiences for the users. However, multi-user simulated environments require the establishment and maintenance of network connections through which data for updating and synchronizing the states of the respective applications being executed on different computing devices is shared. The multi-user simulated environments become more complicated when the users desire to share more than one XR application simultaneously.

The subject technology provides a group communications platform that is a system level process integrated into the operating system of a computing device. The group communications platform facilitates multiple users joining a group session to be present (e.g., concurrently present) in a common XR environment via their respective computing devices. For example, the subject technology establishes and maintains a system-level network connection between operating systems on the respective computing devices for the group session. This system-level network connection is exposed to higher level applications and system services to facilitate communication with corresponding applications and system services on another computing device without each application and/or system service being required to establish and maintain its own network connection with the other computing device. In addition, the system-level network connection may be an out-of-process network connection that is exposed to allow multiple applications and/or system services to utilize the connection in place of using multiple network connections associated with respective applications and/or system services within the same group session.

According to aspects of the subject technology, a local user may wish to initiate a group session with a remote user to share and be present (e.g., concurrently present) in a common XR environment. The local user and the remote user may be in close proximity to one another, such as being in the same room, or may be geographically remote from one another, such as being on opposite sides of the planet. A request to initiate the group session for the local user and the remote user may be received by the system. In response to the request, an out-of-process network connection with a system communication channel between a local computing device associated with the local user and a remote computing device associated with the remote user may be established for the group session. The system communication channel may include a connection with a relay server that manages connections and communications with all participants in the group session. Alternatively, the system communication channel may comprise a peer-to-peer connection between the local computing device and the remote computing device.

One or more applications may be shared between participants in the group session. Data may be exchanged between respective instances of the applications to update the respective states of the applications in the common XR environment. For example, a local instance of a first application on the local computing device may make a system call to transfer local data to a remote instance of the first application on the remote computing device via the out-of-process network connection. In response to the system call, the local data may be transferred to the remote instance of the first application on the remote computing device via the out-of-process network connection and the system communication channel. Similarly, a local instance of a second application participating in the group session may make a system call to transfer local data to a remote instance of the second application on the remote computing device via the out-of-process network connection. The local data of the second application may then be transferred to the remote instance of the second application using the same out-of-process network connection as was used by the first application.

FIG. 1 illustrates an example network environment in which a group communications platform may operate in accordance with aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes computing devices 102, 104, 106, and 108 (hereinafter 102-108), server 110, and network 112. The network 112 may communicatively (directly or indirectly) couple, for example, any two or more of computing devices 102-108 and the server 110. In one or more implementations, the network 112 may be an interconnected network of devices that may include, and/or may be communicatively coupled to, the Internet. Any two of computing devices 102-108 (e.g., computing devices 104 and 106 depicted in FIG. 1) may be communicatively coupled using a peer-to-peer connection such as using Bluetooth, near-field communication, Wi-Fi, etc. For explanatory purposes, the network environment 100 is illustrated in FIG. 1 as including computing devices 102-108 and the server 110; however, the network environment 100 may include any number of computing devices and any number of servers.

One or more of computing devices 102-108 may be, for example, a portable computing device such as a laptop computer, a smartphone, a smartwatch, a tablet device, a wearable device, and the like, or any other type of device that includes, for example, one or more wireless interfaces, such as WLAN radios, cellular radios, Bluetooth radios, Zigbee radios, near field communication (NFC) radios, and/or other wireless radios. In FIG. 1, by way of example, computing device 102 is depicted as a smartphone, computing device 104 is depicted as a laptop computer, computing device 106 is depicted as a tablet device, and computing device 108 is depicted as another smartphone. Wearable devices may include headsets, goggles, glasses, and other types of head mountable devices. Head mountable devices also may include an apparatus in which a smartphone can be arranged to create a headset worn by a user. Each of computing devices 102-108 may be, and/or may include all or part of, the device discussed below with respect to FIG. 2, and/or the computing device discussed below with respect to FIG. 5.

Server 110 may be, and/or may include all or part of the device discussed below with respect to FIG. 5. Server 110 may include one or more servers, such as a cloud of servers. For explanatory purposes, a single server 110 is shown and discussed with respect to various operations. Server 110 may be a relay server configured to manage connections with two or more of computing devices 102-108 that have joined a group session to facilitate communication of data between applications executing on computing devices 102-108. Server 110 may manage unicast communications between respective pairs of computing devices 102-108 in the group session. Server 110 also may manage fan out communications from one of computing devices 102-108 to the other participants in the group session. However, these and other operations discussed herein may be performed by one or more servers, and each different operation may be performed by the same or different servers.

FIG. 1 also includes user A, user B, user C, and user D, who are associated with computing devices 102-108, respectively. A user may be considered to be associated with a particular computing device based on the user logging into the computing device using a set of credentials of a user account granting access to resources and contents of the computing device. The computing device itself may authenticate the credentials or the credentials may be passed along to an authentication server for authentication. While FIG. 1 illustrates one user associated with each depicted computing device, a particular user may be associated with more than one computing device.

As discussed in more detail below, the subject technology facilitates the creation of a group session for two or more of users A-D to share a first application. For example, user A may wish to initiate a group session including user A and user B. According to aspects of the subject technology, an out-of-process network connection with a system communication channel between computing device 102 and computing device 104 managed by server 110 may be established on each of computing device 102 and computing device 104. Data may be exchanged between respective instances of the first application on computing device 102 and on computing device 104 via the out-of-process network connections and the system communication channel to update the respective states of the instances of the first application. In this manner, user A and user B may experience and be present (e.g., concurrently present) in the environment generated by the first application.

Figure 2:
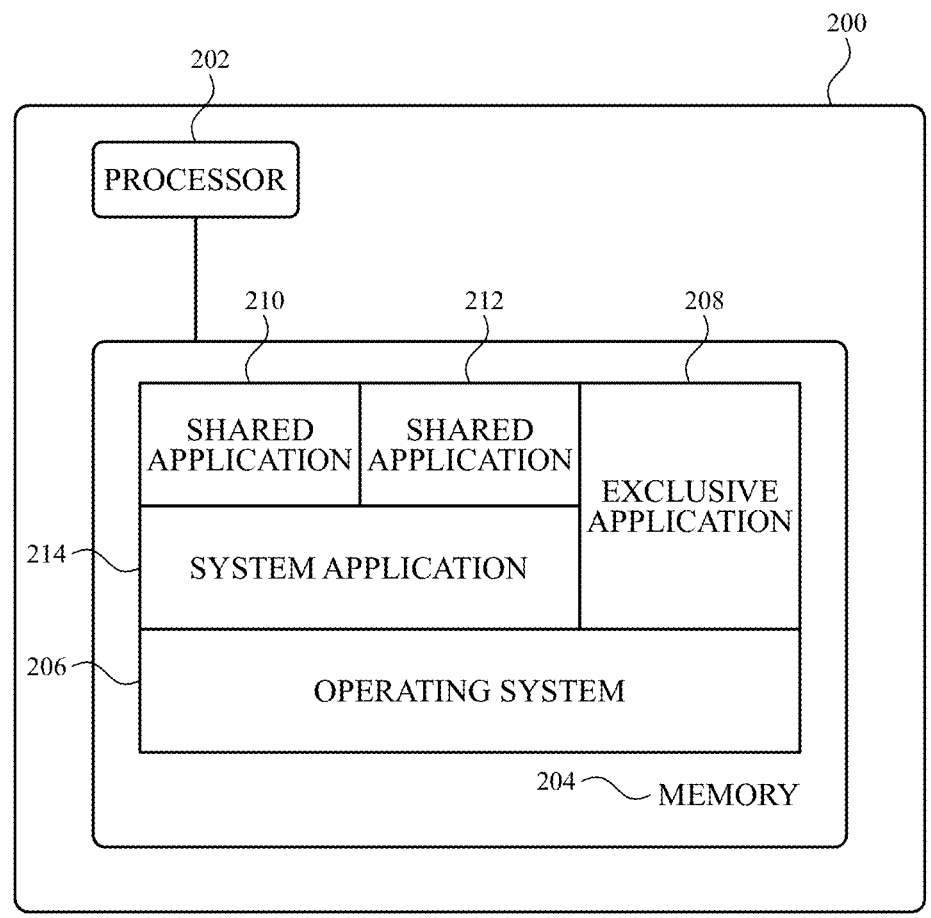
FIG. 2 illustrates an example computing device that may implement aspects of the subject technology.

FIG. 2 illustrates an example computing device 200 that implements aspects of the subject technology. Computing device 200 may correspond to any of computing devices 102-108 represented in FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, computing device 200 includes processor 202 and memory 204. Processor 202 may include suitable logic, circuitry, and/or code that enable processing data and/or controlling operations of computing device 200. For example, processor 202 may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In this regard, processor 202 may be enabled to provide control signals to various other components of computing device 200. Processor 202 may also control transfers of data between various portions of computing device 200. Additionally, processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. As depicted in FIG. 2, memory 204 may contain code, or sequences of instructions, that are executable by processor 202 to implement various software components. For example, memory 204 may contain code for operating system 206, exclusive application 208, shared applications 210 and 212, and system application 214. While FIG. 2 includes only one example of an exclusive application and a system application, and two examples of shared applications, the subject technology is not limited to these numbers. More than one exclusive application and system application, and/or more than two shared applications may be found in memory 204 and be available for execution by processor 202.

Operating system 206 manages the resources of computing device 200 and facilitates the communication of data and control signals between components of computing device 200. According to aspects of the subject technology, the group communications platform is integrated into operating system 206 such that operating system 206 facilitates, at a system level, a user of computing device 200 sharing an experience or functionality provided by one or more of the applications being executed on computing device 200 with other users via other respective computing devices executing other instances of the one or more applications.

Exclusive application 208 represents an application that operates in a full-screen mode when executed by processor 202. In this regard, exclusive application 208 assumes control of the user interface of computing device 200 when exclusive application 208 is active. For example, exclusive application 208 may generate an XR environment that is rendered for display on computing device 200 and interacted with by the user via a user interface of computing device 200. Only one exclusive application may be active on computing device 200 at a time.

Shared applications 210 and 212 represent applications that operate in a multi-tasking environment that allows more than one application to be active in the graphical user interface of computing device 200 at a time. Each of shared applications 210 and 212 may generate XR objects that coexist within an overall XR environment. System application 214 manages the overall XR environment by controlling the launching, movement, and closing of shared applications 210 and 212. The user of computing device 200 may interact with the different XR objects within the XR environment via the user interface of computing device 200. In this regard, system application 214 behaves like an exclusive application and assumes control of the user interface of computing device 200.

An XR environment may include one or more XR objects with which a user may interact or experience. XR objects may represent different sensory experiences (e.g., sight, sound). For example, an XR object may be a visually rendered object that a user may observe with the XR environment. The visually rendered object may be only for observation by the user or may include user interface elements that allow the user to interact with the XR object and/or access functionality provided by the underlying code of the XR object. Another XR object may be an audio object that provides spatial audio for the XR environment. The spatial audio object may be played using audio components of computing device 200 and may correspond with visual XR objects and their respective positions within the overall XR environment.

Figure 3:
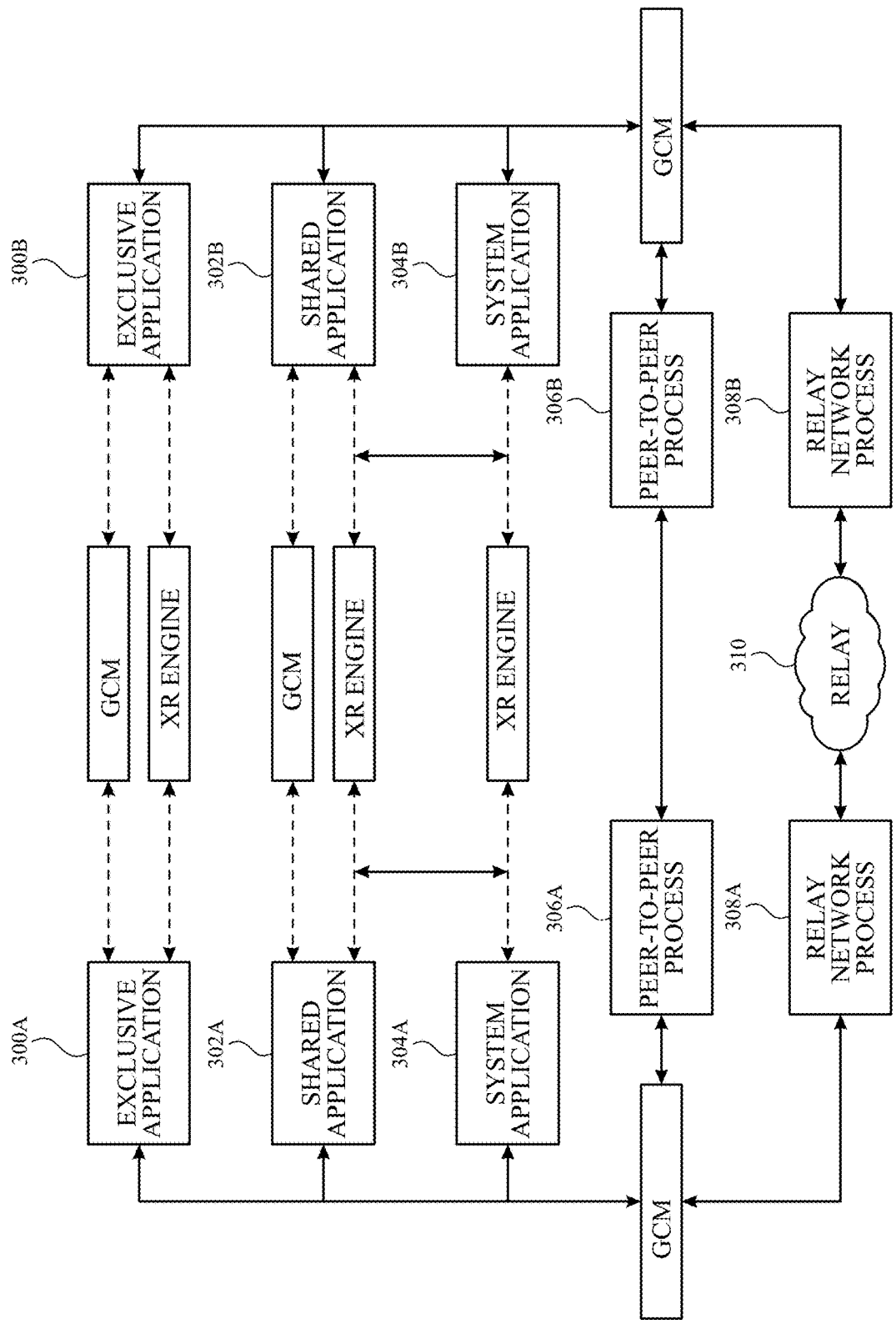
FIG. 3 is a block diagram of components illustrating data flow managed by the group communications platform according to aspects of the subject technology.

FIG. 3 is a block diagram of components illustrating data flow managed by the group communications platform according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

FIG. 3 depicts software components of two computing devices with representations of data flow between the components using aspects of the group communications platform. For example, exclusive application 300A, shared application 302A, system application 304A, peer-to-peer process 306A, and relay network access 308A represent software code executable on a first computing device. Similarly, exclusive application 300B, shared application 302B, system application 304B, peer-to-peer process 306B, and relay network access 308B represent software code executable on a second computing device. Exclusive applications, shared applications, and system applications are described above with respect to FIG. 2.

Peer-to-peer processes 306A and 306B represent background processes executing on their respective computing devices to facilitate communication of data between the computing devices via a peer-to-peer communication channel. Relay network processes 308A and 308B represent background processes executing on their respective computing devices to facilitate communication of data between the computing devices via a relay network communication channel managed by a relay server represented by relay 310 in FIG. 3. The computing devices may use one or both of these types of communication channels to communicate with each other. According to aspects of the subject technology, multiple peer-to-peer communication channels connecting different respective computing devices may be maintained by multiple peer-to-peer processes. A computing device also may be in communication with multiple other computing devices via the relay network communication channel with the relay server managing unicast connections between respective pairs of computing devices and/or multicast connections originated from one or more of the computing devices.

The group communications management (GCM) blocks in FIG. 3 represent an application programming interface (API) provided by the group communications platform for applications, such as exclusive applications, shared applications, and system applications, executing on a computing device to access the functionality provided by the group communications platform. The API may include functions to initiate a group session, share an application with a group session, invite another user to join a group session, and leave a group session, for example. The API may further include methods to register XR objects to be replicated and synched between two or more computing devices. The API may include various callback functions for notifying users when a group session has started or ended, notifying when a particular user has joined or left a group session, notifying when a particular application has been shared in or removed from a group session, providing user IDs for user participating in a group session and identifying whether users in the group session are physically proximate (e.g., in the same room) or geographically distant (e.g., located in a different building, city, country, etc.). The API surfaces a handle for an out-of-process network connection to a communication channel established between computing devices. The API includes methods for communicating data via the out-of-process network connection to individual computing devices in the group session and/or to multiple computing devices in the group session (e.g., fan-out communication).

The XR ENGINE blocks in FIG. 3 represent an API for a low-level rendering system that manages ownership and synchronization of XR objects by applications within an XR environment. The rendering system may include simulation and physics engines for use in the rendering process. The XR engine may facilitate communication between the different applications on its own outside of the group communications platform described herein. Alternatively, the XR engine might utilize the group communications platform for the connection to initiated connection and communicate data between instances of an application.

The blocks in FIG. 3 are shown as being connected with either a solid line arrow or a dashed line arrow. The solid line arrows represent actual data flow between software components while the dashed lines represent perceived data flow between software components. For example, exclusive application 300A may transfer/communicate data to exclusive application 300B via the group communications platform to update a state of exclusive application 300B based on changes to the state of exclusive application 300A. Because the group communications platform establishes and maintains an out-of-process network connection to be used for such data transfers, exclusive applications 300A and 300B can behave as if they are directly connected through the group communications platform API without being concerned with managing the actual network connection enabling the transfer of data. The solid arrows between shared application 302A and system application 304A, and between shared application 302B and system application 304B represent the communication of data within the XR engine network to enable the system applications to render XR objects generated by the respective shared applications within the shared XR environment.

Figure 4:
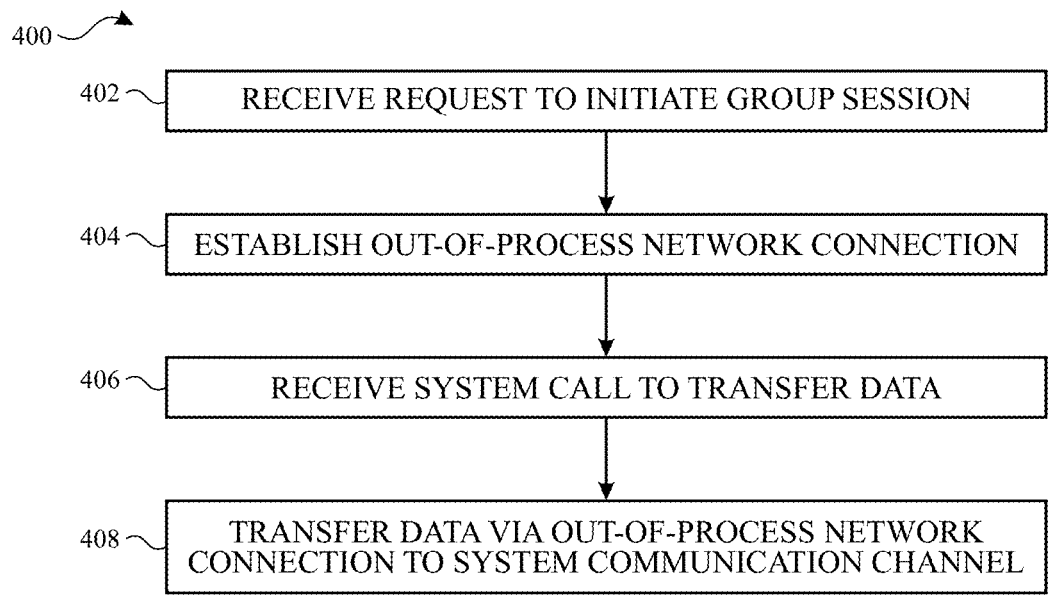
FIG. 4 illustrates a flow diagram of an example process for managing a group session for a shared XR environment according to aspects of the subject technology.

FIG. 4 illustrates a flow diagram of an example process for managing a group session for a shared XR environment according to aspects of the subject technology. The blocks of process 400 are described herein as occurring in serial, or linearly. However, multiple blocks of process 400 may occur in parallel. In addition, the blocks of process 400 need not be performed in the order shown and/or one or more blocks of process 400 need not be performed and/or can be replaced by other operations.

The group communications platform on a computing device receives a request to initiate a group session for a group of users (block 402). The request may be in response to a user interaction with a user interface element of an exclusive application, a shared application, a system application, or an operating system indicating the user's desire to initiate the group session. The request may include a user ID for each of the users invited to participate in the group session and an identifier for each of the applications to be shared within the group session.

In response to the request, the group communications platform on the computing device creates the group session and assigns a group ID to the session. The group communications platform further establishes an out-of-process network connection with a system communication channel for the group session (block 404). As noted above, the out-of-process network connection is managed by the group communications platform rather than the individual applications. This configuration allows multiple applications to take advantage of the network connection without be burdened by the overhead associated with managing the connection. The system communication channel may be through a network and relay server where the application may rely on identity services provided by the relay server to communicate with computing devices associated with other users in the group session. The out-of-process network connection may provide access to a socket by exposing a handle for the socket to the applications being shared in the group session.

The group communications platform on the computing device may send an invitation to the others users invited to participate at respective computing devices associated with those users via the out-of-process network connection and system communication channel. If the other users accept the invitation with an affirmative interaction with the user interface of the respective computing devices, the group communications platform may provide a notification of the other users joining the group session.

According to aspects of the subject technology, a group session may have already been created for a group of users. In this situation, the group communications platform may receive a request to share a new application with users within the group session. An invitation may be sent out by the group communications platform to the other participants in the group session to share the new application. If the other participants in the group session accept the invitation, the group communications platform may provide a notification of the acceptances.

According to aspects of the subject technology, the group communications platform may receive a request to add a new user to an existing group session. The group communications platform may send out an invitation to the new user at a computing device associated with the new user to join the group session and share the application or applications being shared within the group session. If the new user accepts the invitation, the group communications platform may provide a notification of the acceptance.

During the group session, the group communications platform may receive a system call to transfer data from a first instance of an application being shared to other instances of the shared application on the computing devices associated with the other users participating in the group session via the out-of-process network connection (block 406). After receiving the system call, the group communications platform facilitates the transfer of the data via the out-of-process network connection to the system communication channel (block 408). According to aspects of the subject technology, the data transfer process may use a shared system memory to which the sharing instance of the application writes the data to be shared. A system call from the sharing application may be forwarded by the group communications platform to either the peer-to-peer process or the relay network process, depending on which system communication channel is being used. The process receiving the system call reads out the data from the shared memory and transfers the data to the corresponding process on the other computing device to be distributed to the corresponding application on that computing device.

The data transferred between instances of the sharing application may include state data of on instance of the sharing application to be used by another instance of the sharing application to update the state of that instance of the sharing application. The state of each instance of the sharing application may be updated to reflect changes in the respective states of the other instances of the sharing application by each instance transferring state data to the other instances. In this matter, a multi-user state may be maintained for the sharing application and kept consistent across all of the instances of the sharing application. Each instance of the sharing application may manage the coordination with the other instances. Alternatively, one instance of the sharing application may be responsible for collecting state data from all other instances of the sharing application and then combining the state data into a single set of multi-user state data for transfer to the other instances of the sharing application.

According to aspects of the subject technology, the states of different instances of a sharing application may not be maintained as identical states. For example, the user of one instance of the sharing application may only want to a portion of the sharing application with the other users in a group session. The data transferred to the other instances of the sharing application in this example, include only the information that is intended to be shared so that the other instances of the sharing application are updated to reflect the shared information only.

A user may have an application installed on their associated computing device that has not been installed on the computing devices of other users participating in a group session. Upon receiving a request to share the application with the other users in the group session, the group communications platform may send an invitation to the other computing devices. Upon receiving the invitation, the group communications platform on the other computing devices may generate an invitation to install the missing application on the other computing devices. If the other users accept the invitation and install the missing application on their respective computing devices, the sharing process may proceed as outlined above.

Another alternative to the situation where a shared application is not installed on the computing devices of other users in a group session, the application may be casted to the other computing devices to replicate the visual and/or audio aspects of the shared application without providing interactivity with the shared application for the other users. For example, if a shared application is not installed on the other computing device, the system application managing the shared application on the first computing device, may pass along a scene graph including the visual interface of the shared application to the corresponding system application on the other computing device. The corresponding system application renders the scene graph on the other computing device so that the other users can see the visual representation of the shared application even though they are unable to interact with the shared application.

As described above, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in a collaborative setting with multiple users. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of selectively sharing information from a particular application, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 5:
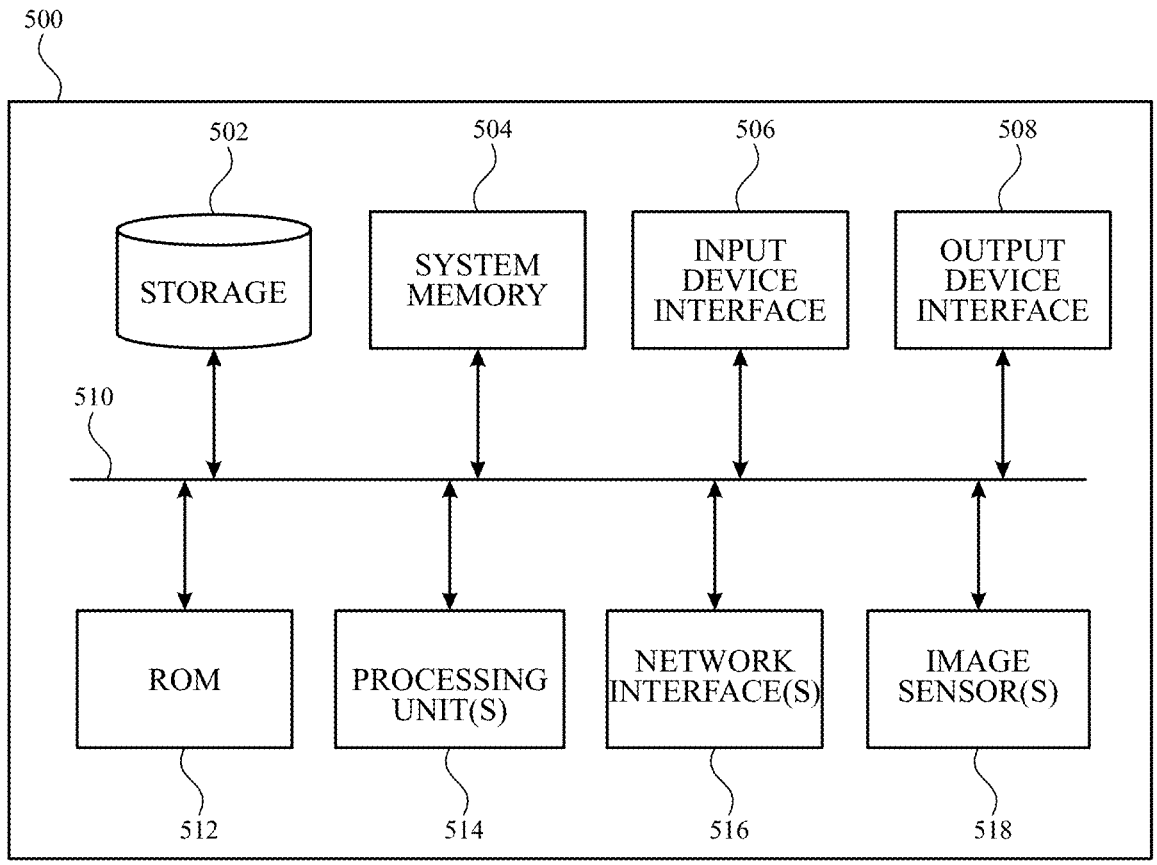
FIG. 5 illustrates an example computing device with which aspects of the subject technology may be implemented.

FIG. 5 illustrates an example computing device with which aspects of the subject technology may be implemented in accordance with one or more implementations. The computing device 500 can be, and/or can be a part of, any computing device or server for generating the features and processes described above, including but not limited to a laptop computer, a smartphone, a tablet device, a wearable device such as a goggles or glasses, and the like. The computing device 500 may include various types of computer readable media and interfaces for various other types of computer readable media. The computing device 500 includes a permanent storage device 502, a system memory 504 (and/or buffer), an input device interface 506, an output device interface 508, a bus 510, a ROM 512, one or more processing unit(s) 514, one or more network interface(s) 516, image sensor(s) 518, and/or subsets and variations thereof.

The bus 510 collectively represents all system, peripheral, and chipset buses that communicatively connect the numerous internal devices of the computing device 500. In one or more implementations, the bus 510 communicatively connects the one or more processing unit(s) 514 with the ROM 512, the system memory 504, and the permanent storage device 502. From these various memory units, the one or more processing unit(s) 514 retrieves instructions to execute and data to process in order to execute the processes of the subject disclosure. The one or more processing unit(s) 514 can be a single processor or a multi-core processor in different implementations.

The ROM 512 stores static data and instructions that are needed by the one or more processing unit(s) 514 and other modules of the computing device 500. The permanent storage device 502, on the other hand, may be a read-and-write memory device. The permanent storage device 502 may be a non-volatile memory unit that stores instructions and data even when the computing device 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 514 may need at runtime. In one or more implementations, the processes of the subject disclosure are stored in the system memory 504, the permanent storage device 502, and/or the ROM 512. From these various memory units, the one or more processing unit(s) 514 retrieves instructions to execute and data to process in order to execute the processes of one or more implementations.

The bus 510 also connects to the input and output device interfaces 506 and 508. The input device interface 506 enables a user to communicate information and select commands to the computing device 500. Input devices that may be used with the input device interface 506 may include, for example, alphanumeric keyboards and pointing devices (also called "cursor control devices"). The output device interface 508 may enable, for example, the display of images generated by computing device 500. Output devices that may be used with the output device interface 508 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 510 also connects to the image sensor(s) 518. In one or more implementations, the image sensor(s) 520 may be utilized to capture image data, including but not limited to RGB image data or infrared image data.

Finally, as shown in FIG. 5, the bus 510 also couples the computing device 500 to one or more networks and/or to one or more network nodes through the one or more network interface(s) 516. In this manner, the computing device 500 can be a part of a network of computers (such as a LAN, a wide area network ("WAN"), or an Intranet, or a network of networks, such as the Internet. Any or all components of the computing device 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, at an operating system of a local computing device of a local user, a request to initiate a group session for the local user and a remote user;
   establishing, for the group session by the operating system of the local computing device and separately from a local instance of a first application, an out-of-process network connection with a system communication channel between the local computing device associated with the local user and a remote computing device associated with the remote user;
   receiving, at the operating system of the local computing device, a system call from the local instance of a first application on the local computing device to transfer local data to a remote instance of the first application on the remote computing device via the out-of-process network connection; and
   transferring, by the operating system of the local computing device, the local data to the remote instance of the first application on the remote computing device via the out-of-process network connection and the system communication channel and separately from the local instance of the first application,
   wherein the local data comprises state data of the local instance of the first application for updating a state of the remote instance of the first application.

2. The method of claim 1, further comprising:
   sending an invitation to join the group session via the system communication channel to the remote user at the remote computing device in response to the request to initiate the group session; and
   providing notification when the remote user joins the group session.

3. The method of claim 1, wherein transferring the local data to the remote instance of the first application comprises:
   reading the local data from a shared memory, wherein the local data was written to the shared memory by the local instance of the first application.

4. The method of claim 1, further comprising:
   receiving a request to share a second application in the group session;
   sending an invitation to share the second application to the remote user at the remote computing device via the system communication channel; and
   providing notification of a response to the invitation from the remote user.

5. The method of claim 4, further comprising:
   receiving an other system call from a local instance of the second application on the local computing device to transfer other local data to a remote instance of the second application on the remote computing device via the out-of-process network connection; and
   transferring the other local data to the remote instance of the second application on the remote computing device via out-of-process network connection and the system communication channel.

6. The method of claim 5, wherein the other local data comprises state data of the local instance of the second application for updating a state of the remote instance of the second application.

7. The method of claim 5, wherein the other local data comprises a scene graph of a user interface of the local instance of the second application for rendering at the remote computing device.

8. The method of claim 1, further comprising:
   receiving a request for an other user to join the group session;
   receiving an other system call from the local instance of the first application on the local computing device to transfer other data to the remote instance of the first application on the remote computing device and an other instance of the first application on an other computing device via the out-of-process network connection; and transferring the other data to the remote instance of the first application via the out-of-process network connection and the system communication channel and to the other instance of the first application via the out-of-process network and an other system communication channel between the local computing device and the other computing device, wherein the other data comprises multi-user state data of the first application for updating a state of the remote instance of the first application and a state of the other instance of the first application.

9. The method of claim 1, wherein the system communication channel comprises a peer-to-peer connection between the local computing device and the remote computing device.

10. The method of claim 1, wherein the system communication channel comprises a relay server configured to manage communications between the local computing device and the remote computing device via a network.

11. A device, comprising:
a processor; and
a memory containing instructions that, when executed by the processor, cause the processor to:
receive, at an operating system of a local computing device of a local user, a request to share a first application in a group session for the local user and a remote user;
receive, by the operating system of the local computing device and separately from a local instance of the first application, a system call from the local instance of the first application on the local computing device associated with the local user to transfer local data to a remote instance of the first application on a remote computing device associated with the remote user via an out-of-process network connection to a system communication channel established for the group session by the operating system of the local computing device; and
transfer, by the operating system of the local computing device, the local data to the remote instance of the first application on the remote computing device via the out-of-process network connection and the system communication channel and separately from the local instance of the first application,
wherein the local data comprises state data of the local instance of the first application for updating a state of the remote instance of the first application.

12. The device of claim 11, wherein the instructions further cause the processor to:
send an invitation to share the first application to the remote user at the remote computing device via the system communication channel; and
provide notification of a response to the invitation from the remote user.

13. The device of claim 11, wherein the transfer of the local data to the remote instance of the first application comprises reading the local data from a shared memory, wherein the local data was written to the shared memory by the local instance of the first application.

14. The device of claim 11, wherein the instructions further cause the processor to:
receive an other request to share the first application with an other user in the group session,
wherein the system call from the local instance of the first application is further to transfer the local data to an other instance of the first application on an other computing device associated with the other user via the out-of-process network connection to a second system communication channel established for the group session; and
transfer the local data to the other instance of the first application on the other computing device via the out-of-process network connection and the other system communication channel,
wherein the local data is for updating a state of the other instance of the first application.

15. The device of claim 14, wherein the system communication channel and the other system communication channel are the same system communication channel and comprise a relay server configured to manage communications between the local computing device, the remote computing device, and the other computing device via a network.

16. The device of claim 14, wherein the system communication channel comprises a relay server configured to manage communications between the local computing device and the remote computing device, and
wherein the other system communication channel comprises a peer-to-peer connection between the local computing device and the other computing device.

17. The device of claim 14, wherein the system communication channel comprise a first peer-to-peer connection between the local computing device and the remote computing device, and
wherein the other system communication channel comprises a second peer-to-peer connection between the local computing device and the other computing device.

18. A computer program product comprising code stored in a non-transitory computer-readable storage medium, the code comprising:
code for receiving, at an operating system of a local computing device of a local user, a request to initiate a group session for the local user and a remote user;
code for establishing, for the group session by the operating system of the local computing device and separately from a local instance of an application, an out-of-process network connection with a system communication channel between the local computing device associated with the local user and a remote computing device associated with the remote user;
code for capturing sensory information at the local computing device;
code for receiving, at the operating system of the local computing device, a system call from the local instance of the application on the local computing device to transfer local data to a remote instance of the application on the remote computing device via the out-of-process network connection; and
code for transferring, by the operating system of the local computing device, the local data and the sensory information to the remote instance of the application on the remote computing device via the out-of-process network connection and the system communication channel and separately from the local instance of the application,
wherein the local data comprises state data of the local instance of the application for updating a state of the remote instance of the application.

19. The computer program product of claim 18, wherein the sensory information comprises spatial audio information captured by the local computing device.

20. The computer program product of claim 18, wherein a state of the local instance of the application is different than the updated state of the remote instance of the application.

\* \* \* \* \*

UNITED STATES PATENT AND TRADEMARK OFFICE
CERTIFICATE OF CORRECTION

PATENT NO. : 11,765,214 B2  
APPLICATION NO. : 17/224072  
DATED : September 19, 2023  
INVENTOR(S) : Bruno M. Sommer et al.

Page 1 of 1

It is certified that error appears in the above-identified patent and that said Letters Patent is hereby corrected as shown below:

On the Title Page

IN REFERENCES CITED (item (56)) IN OTHER PUBLICATIONS:  
Line 3:  
"multiview_immersion _in_"  
Should read:  
--multiview_immersion_in_--

Signed and Sealed this  
Thirtieth Day of January, 2024

Katherine Kelly Vidal  
*Director of the United States Patent and Trademark Office*